Patented Oct. 27, 1953

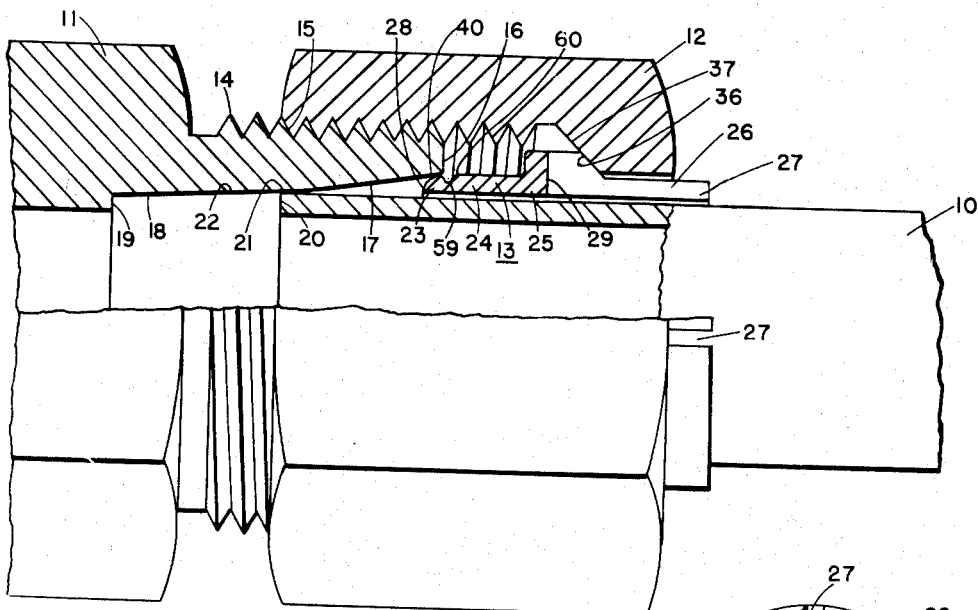
FIG. 1
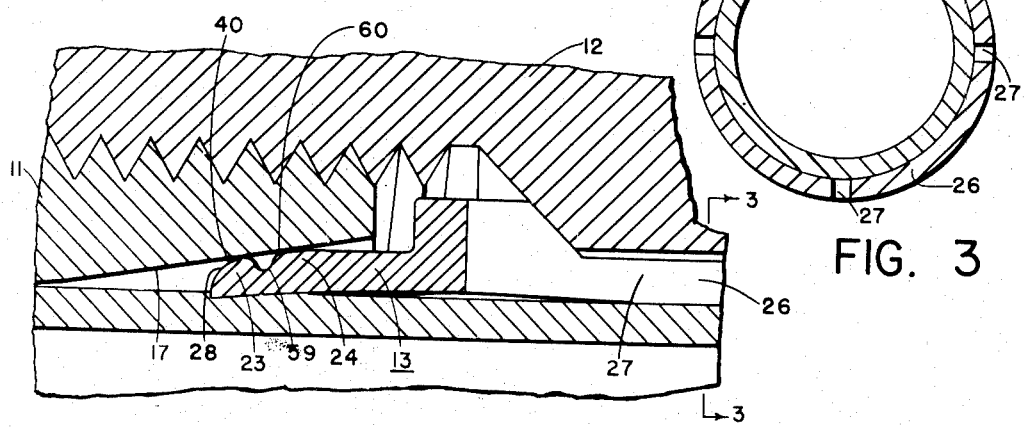
FIG. 2
FIG. 3
*INVENTOR.*
George V. Woodling

2,657,077

UNITED STATES PATENT OFFICE 2,657,077

FLARELESS SLEEVE CONNECTOR HAVING FORWARD CONTRACTIBLE RING END PORTION AND REARWARD SPRING FINGERS

George V. Woodling, Cleveland, Ohio

Original application June 20, 1947, Serial No. 755,833. Divided and this application June 11, 1949, Serial No. 98,468

1 Claim. (Cl. 285—122)

My invention relates to tube couplings and more particularly to tube couplings of the non-flare type having a contractible sleeve for engaging the tube. This application is a division of my application Serial No. 755,833, filed June 20, 1947 for "Flareless Tube Coupling," now Patent No. 2,472,872, issued June 14, 1949.

An object of my invention is to provide a first sealing engagement by pressing the end of the tube into a tapered counterbore of a coupling body and a second sealing engagement by pressing a contractible sleeve between the tube and a tapered flared mouth leading outwardly toward the end of the coupling body from the tapered counterbore.

Another object of my invention is to provide, in a tube coupling of the non-flare type, a connector body having a tapered counterbore to wedgingly receive the end of the tube and a tapered flared mouth leading outwardly toward the end of the coupling body from the tapered counterbore to receive a contractible sleeve mounted around and adapted to be contracted against the tube.

Another object of my invention is the provision of a contractible sleeve for a non-flare coupling, in which the sleeve has a readily contractible portion to grip the tube and a substantially noncontractible portion to limit the degree that the contractible portion may grip the tube.

Another object of my invention is to provide a contractible sleeve constructed of steel capable of being quench hardenable throughout its entire mass and thereafter tempered or drawn back to a hardness value sufficient to permit the leading marginal end section to be cammed or deflected inwardly against the tube but to prevent the section next adjacent the leading marginal end section from contracting inwardly to provide a "hit home" feeling to the tightening of the coupling nut.

Another object of my invention is the provision of a non-flare coupling having a contractible sleeve which gives a "hit home" feeling to the tightening of the nut and yet permits the sleeve to be re-set upon each repeated assemblying of the coupling.

More specifically, an object of my invention is to provide, in a tube coupling of the non-flare type, a contractible sleeve disposed to be pressed into an internal annular cam surface for making engagement with a tube as the nut of the coupling is tightened, the sleeve comprising a continuous annular body constructed of steel capable of being quench hardenable throughout its entire mass and thereafter tempered or drawn back to a hardness value greater than that of the tube and having a readily contractible portion and a substantially noncontractible portion, both of which portions being adapted to be pressed against the internal annular cam surface, the contractible portion being disposed at the leading marginal end of the sleeve and being adapted to cam or deflect inwardly against the tube as the sleeve is initially pressed into the internal cam surface for gripping the tube, the substantially non-contractible portion being disposed next adjacent to and merging with the contractible portion and resisting further inward contraction of the sleeve, the resisting action limiting the amount that the sleeve may be pressed into the internal annular cam surface and thereby producing a "hit home" feeling to the tightening of the nut.

Another object of my invention is to provide a sleeve having an external groove separating the contractible ring end portion from the substantially noncontractible ring body portion.

Another object of my invention is to eliminate an abutment shoulder in the coupling body against which the end of the tube may abut, whereby the tube may move longitudinally with the sleeve as the sleeve contractibly engages the tube.

Another object of my invention is to prevent the sleeve from shearing or "plowing" up an annular ridge of appreciable size around the tube in advance of the leading end of the sleeve by permitting the tube to longitudinally move along with the sleeve as it is contracted about the tube.

Another object of my invention is to provide at the rearward end of the sleeve a plurality of contractible segmental fingers which are adapted to be contracted into gripping relation with the tube as the nut is tightened.

Other objects and a fuller understanding of my invention may be had by referring to the following description and claims, taken in combination with the accompanying drawing, in which:

Figure 1 is an enlarged side view of a tube coupling embodying the features of my invention, the upper part being shown in section to illustrate the relationship of the parts prior to the time that the nut is tightened;

Figure 2 is a fragmentary view of Figure 1 and shows the relationship of the parts after the nut is tightened; and Figure 3 is a cross-sectional view taken along the line 3—3 of Figure 2, and illustrates the disposition of the rearwardly extending segmental fingers which grippingly engage the tube when the nut is tightened.

With reference to Figure 1 of the drawing, my invention comprises generally a coupling body 11, a coupling nut 12, and a contractible sleeve 13 adapted to contractibly engage a tube 10.

The coupling body 11 is provided at its right-hand end with male threads 14 which are adapted to be threadably engaged by female threads 15 provided in the nut 12 for pressing the sleeve into engagement with the tube. As illustrated, the coupling body 11 is provided with a first entrance flare 17 and a second entrance flare 18 to receive the tube. The second entrance flare 18 comprises a counterbore having an annular tapered wall section with a very small taper in the order of 1 or 2 degrees into which the end of the tube is wedgingly received to provide a tube seal with the coupling body. The first entrance flare 17 has an annular tapered wall section and extends outwardly toward the end 16 of the coupling body from the counterbore 18. The taper of the first entrance flare 17 may be in the order of 10 to 12 degrees measured with respect to the longitudinal axes of the tube.

The sleeve 13 comprises a continuous annular body 25 provided with rearwardly extending segmental fingers 26 which grip the tube when the nut 12 is tightened. The sleeve is constructed of steel capable of being quench hardenable throughout its entire mass and thereafter tempered or drawn back to a hardness value greater than that of the tube. I find that steel known as 4140, heat treated throughout its entire mass and tempered to a hardness value of approximately 30 to 50 Rockwell, is satisfactory for my sleeve. Experience shows that sleeves made of low carbon steel and surface hardened, for example, by a cyanide potassium process are unsatisfactory, for the reason that such sleeves do not have a substantially noncontractible portion to limit the extent the leading edge may be deflected or cammed against the sleeve. The "hit home" feeling is absent in such sleeves and the operator is apt to cut the tube off or at least greatly deform the tube.

In the manufacture of the sleeve, the fingers 26 are provided by making slots 27 in the rearward section thereof at annularly spaced intervals thereabout. In Figure 3, I show four slots, but any other number may be used. The continuous annular body 25 has a first or leading end 28 and a second or rearward end 29. As illustrated, the end 29 constitutes the forward terminus for the slots 27. The continuous annular body 25 has a readily contractible ring end portion 23 and a substantially noncontractible ring body portion 24 separated by a groove 59. The wall section of the sleeve under the groove is sufficiently thin to allow the contractible ring end portion to be cammed inwardly and bite the tube 10. The wall section under the groove may be regarded as an annular juncture which integrally joins the ring end portion and the ring body portion with the thickness of the wall section under the groove being less than that of the ring end portion. The contractible ring end portion 23 terminates in an outer annular cam surface 40 arranged to engage the first entrance flare 17. The intermediate part of the entire sleeve, that is, the rearward end of the continuous annular body 25 and the forward end of the segmental fingers 26 is enlarged to provide a tapered or cam shoulder 36 against which a cam shoulder 37 of the nut engages for pressing the contractible ring end portion 23 of the sleeve into the first entrance flare 17 and for contracting the segmental fingers 26 about the tube.

In operation, as the sleeve is pressed forward by the tightening of the nut, the outer annular cam surface 40 of the sleeve forcibly engages the tapered wall section of the first entrance flare 17 and thereby produces a camming action which cams or deflects the contractible ring end portion 23 of the sleeve against the tube. The camming action embeds the leading end 28 into the tube which resists longitudinal pull of the tube from the sleeve. Inasmuch as the end of the tube wedgingly fits within the second entrance flare 18 which is of a very slow taper, the tube is permitted to move along with the sleeve as the leading end 28 becomes embedded into the tube. Thus, the end of the tube may move from point 21 to point 22 of Figure 1 during the tightening of the nut, the point 21 being the place where the end of the tube becomes arrested when it is manually inserted therein by the operator. The second entrance flare or counterbore 18 is sufficiently long that the end 20 of the tube never abuts against the shoulder 19 of the coupling body. Since the tube may move with the sleeve, I prevent the sleeve from shearing or "plowing up" an annular ridge of appreciable size around the tube in advance of the leading end of the sleeve. The sleeve has a minimum or weakened wall thickness at the groove 59 which separates the readily contractible ring end portion 23 and the substantially noncontractible ring body portion 24, whereby a hinged action is produced so that the readily contractible portion may be cammed or deflected inwardly against the tube notwithstanding the fact that the sleeve is constructed of a quench hardenable steel having a high carbon content as distinguished from a low carbon steel. The wall thickness of the sleeve, beginning at the groove 59 gradually increases as advancement is made in a rearward direction toward the substantially noncontractible ring body portion 24 where the wall thickness becomes a maximum. Both the readily contractible portion 23 and the substantially noncontractible portion 24 are disposed to be pressed against the internal annular cam surface of the first entrance flare 17 in the order named, so that the readily contractible portion 23 makes a first contact point against the first entrance flare 17 and the substantially non-contractible portion 24 makes a second contact point at 60 against the first entrance flare 17. The readily contractible portion 23 has at its forward internal end a tube biting nose which is disposed generally radially inwardly from said first contact point. As the sleeve is initially pressed into the first entrance flare 17, the tube biting nose of the readily contractible portion 23 cams or deflects inwardly against the tube for gripping the tube against longitudinal pull from the coupling body 25. The distance between the first and second points of contact multiplied by the sine of the angle which the first entrance flare 17 makes with the longitudinal axis of the tube is considerably less than the wall tube thickness, whereby the bore of the sleeve is forced into a tapered condition to cause the tube biting nose to dig into the surface of the tube wall a distance considerably less than the thickness of the tube wall. As the sleeve is further pressed into the entrance flare 17, the substantially noncontractible portion 24 resists further inward contraction of the sleeve, the resisting action limiting the amount that the sleeve may be pressed into the entrance flare 17, and thereby producing a "hit home" feeling to the tightening of the nut. The substantially noncontractible portion 24 of the sleeve prevents the leading end or contractible portion 23 from collapsing or inwardly buckling the wall of the tube. As resistance to longitudinal pressing movement of the sleeve is encountered, the cam shoulder 37 of the nut presses against the cam shoulder 36 of the sleeve and contracts the segmental fingers 26 against the tube for giving support to the tube against vibration. The fingers are disposed to spring back from the tube when the nut is released or disengaged.

The engagement of the sleeve against the tube and against the entrance flare 17 provides the main seal against high fluid pressure, as distinguished from the tube or secondary seal afforded by the end of the tube wedgingly fitting into the slow tapered bore 18. Notwithstanding the fact that the tube or secondary seal may allow the escape of fluid which is blocked or sealed by the main seal, yet the tube or secondary seal acts as a buffer to dampen high peak transient fluid shocks from effectively reaching the main seal.

In my fitting, the tube and sleeve may be repeatedly disconnected from and re-connected to the coupling body. Upon each re-connection the sleeve re-seats itself for sealing purposes as there is a certain amount of small give or yielding to the substantially noncontractible portion and the entrance flare 17. The "hit home" feeling which the operator senses upon the tightening of the nut for the initial installation or for the re-coupling installations is definite enough to indicate to the operator to cease attempting to turn the nut on any further.

Upon the surface 60 engaging the deflecting cam surface, the sleeve resists further contraction to limit the extent to which the leading edge may be deflected or cammed against the tube. In other words, that portion in advance of the groove 59 may be considered as the readily contractible portion and that portion in rear of the groove may be considered as the substantially noncontractible portion.

The view of the drawing in Figure 1 is drawn about four times actual scale, and in Figures 2 and 3 about eight times scale. In actual practice for a ½-inch tube, the radial depth of the groove 59 is approximately 15 thousandths of an inch, the maximum wall thickness at the substantially noncontractible portion 24 is approximately 40 thousandths of an inch, and the minimum wall thickness under the groove is approximately 25 thousandths of an inch. For a ½-inch tube, a wall thickness of 40 thousandths of an inch at the ring body portion 24 having a Rockwell value of approximately 45, is substantially noncontractible whereas a wall thickness of 25 thousandths of an inch at the leading end is contractible.

Another feature which marks the present sleeves is the fact that they are constructed of steel capable of being quench hardenable throughout their entire mass and thereafter tempered to a hardness value greater than that of the tube, taken in combination with the fact that the leading end section of the sleeves is physically made thin or weak enough to cam or deflect inwardly to grip the tube, notwithstanding the fact that the steel is hard and strong.

Although I have described my invention with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

In a tube coupling having a cam member provided with an annular cam surface of a given angle relative to the axis thereof, a hardened and resilient sleeve substantially longitudinally non-compressible adapted to be inserted over and contracted about the end of a tube having a given wall thickness, said sleeve comprising a continuous annular body having a first end and a second end with a substantially cylindrical bore extending therethrough to receive the tube, said sleeve having at a point near said first end an external annular groove, the section of the sleeve in advance of said external groove near said first end constituting a readily contractible portion and the section in rear of the external groove constituting a substantially non-contractible portion, said contractible and non-contractible portions contactable with said internal annular cam surface at first and second points of contact, respectively, a tube biting portion on said contractible portion of said sleeve disposed generally radially inwardly from said first contact point, the distance between said points of contact multiplied by the sine of said given angle being considerably less than said wall tube thickness, whereby said bore or said sleeve is forced into a tapered condition to cause said tube biting portion to dig into the surface of the tube wall a distance considerably less than the thickness of the tube wall.

GEORGE V. WOODLING.

References Cited in the file of this patent

UNITED STATES PATENTS

| Number | Name | Date |
|---|---|---|
| 1,866,914 | Stover | July 12, 1932 |
| 2,179,127 | Lauer | Nov. 7, 1939 |
| 2,472,872 | Woodling | June 14, 1949 |
| 2,474,178 | Wurzburger | June 21, 1949 |
| 2,536,745 | Herold | Jan. 2, 1951 |